(12) United States Patent
Kim

(10) Patent No.: US 6,473,262 B1
(45) Date of Patent: Oct. 29, 2002

(54) TECHNIQUES FOR COMPENSATING FOR HIGH INITIAL UNLOADING FORCE REQUIREMENT IN TAPE CARTRIDGE-LOADING MECHANISM

(75) Inventor: William B. Kim, La Habra, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 0 days.

(21) Appl. No.: 09/314,974

(22) Filed: May 20, 1999

Related U.S. Application Data

(60) Provisional application No. 60/116,014, filed on Jan. 15, 1999, and provisional application No. 60/115,958, filed on Jan. 15, 1999.

(51) Int. Cl.⁷ .............................................. G11B 15/675
(52) U.S. Cl. ...................................................... 360/96.5
(58) Field of Search ........................ 360/93, 96.1, 96.5, 360/96.6

(56) References Cited

U.S. PATENT DOCUMENTS

| | | | |
|---|---|---|---|
| 3,980,253 A | 9/1976 | Burdorf et al. | |
| 4,063,294 A | 12/1977 | Burkhart | |
| 4,685,009 A | * 8/1987 | Min et al. | 360/96.5 |
| 4,814,911 A | * 3/1989 | Naoi et al. | 360/96.5 |
| 5,237,469 A | 8/1993 | Kukreja et al. | |
| 5,331,485 A | 7/1994 | Bryer | |
| 5,447,278 A | * 9/1995 | Lalouette et al. | 242/335 |
| 5,495,374 A | 2/1996 | Hiscox et al. | |
| 5,546,370 A | * 8/1996 | Ishikawa | 360/96.5 |
| 5,652,683 A | 7/1997 | Bryer | |
| 5,978,173 A | * 11/1999 | Chu et al. | 360/96.5 |

* cited by examiner

*Primary Examiner*—David L. Ometz
(74) *Attorney, Agent, or Firm*—McDermott, Will & Emery

(57) ABSTRACT

In an automatic tape cartridge loader, separating the tape from the drive motor during unloading often imposes a high torque requirement on the loader motor, for example to overcome magnetic forces strengthening engagement of the cartridge to the motor. The inventive loader utilizes one or more techniques to assist in separation of the cartridge from the motor gear. One technique involves two compression springs on the base, which apply a force opposing movement of the cartridge shuttle to its cartridge-loaded position and assist in movement of the shuttle from that position during unloading. Another technique utilizes a special cam and follower arrangement to apply different lifting forces on opposite sides of the shuttle, at least during initial movement to unload the cartridge.

32 Claims, 7 Drawing Sheets

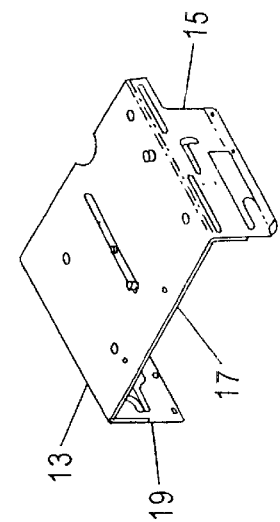
FIG. 1-A
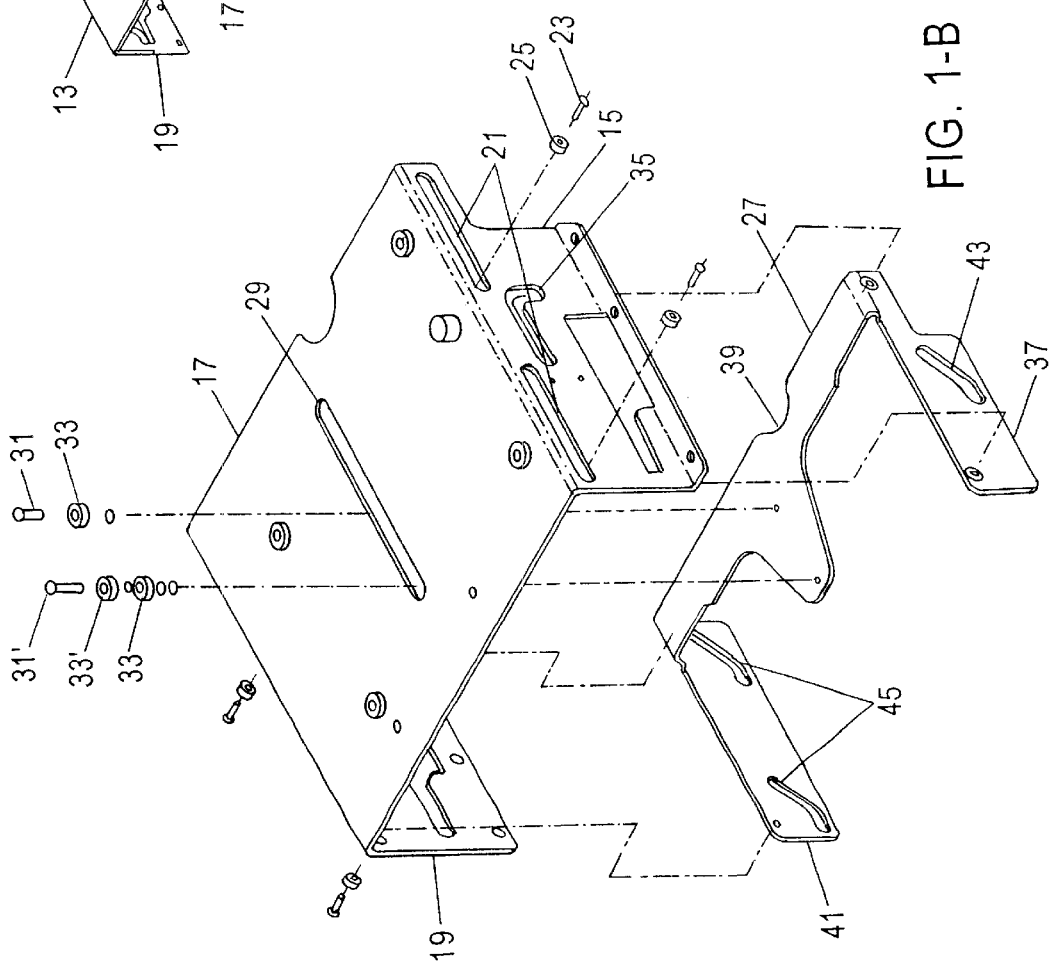
FIG. 1-B

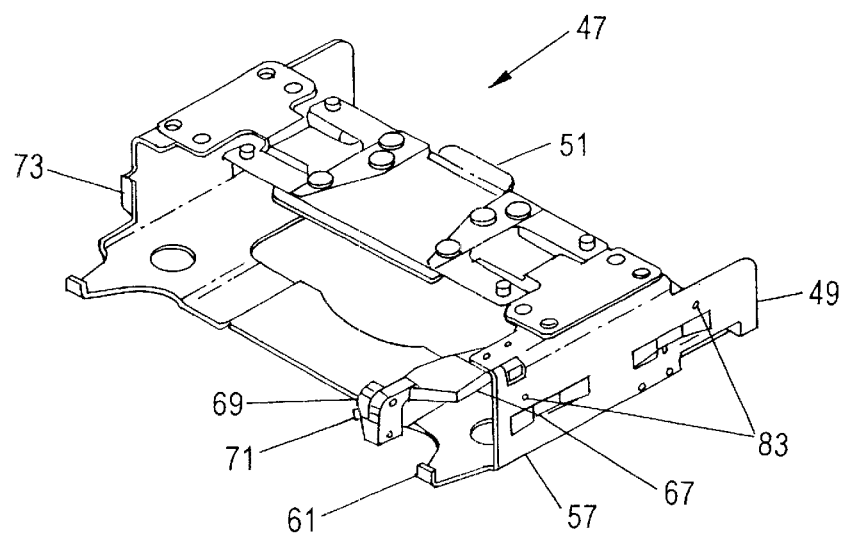
FIG. 2-A
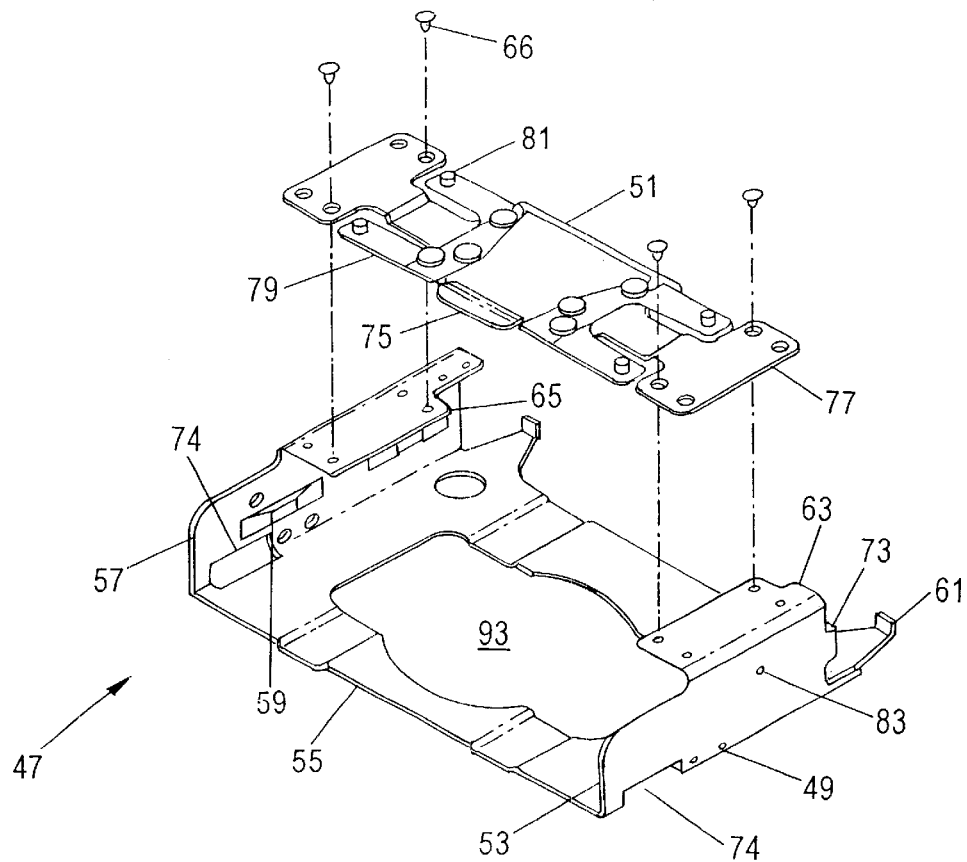
FIG. 2-B

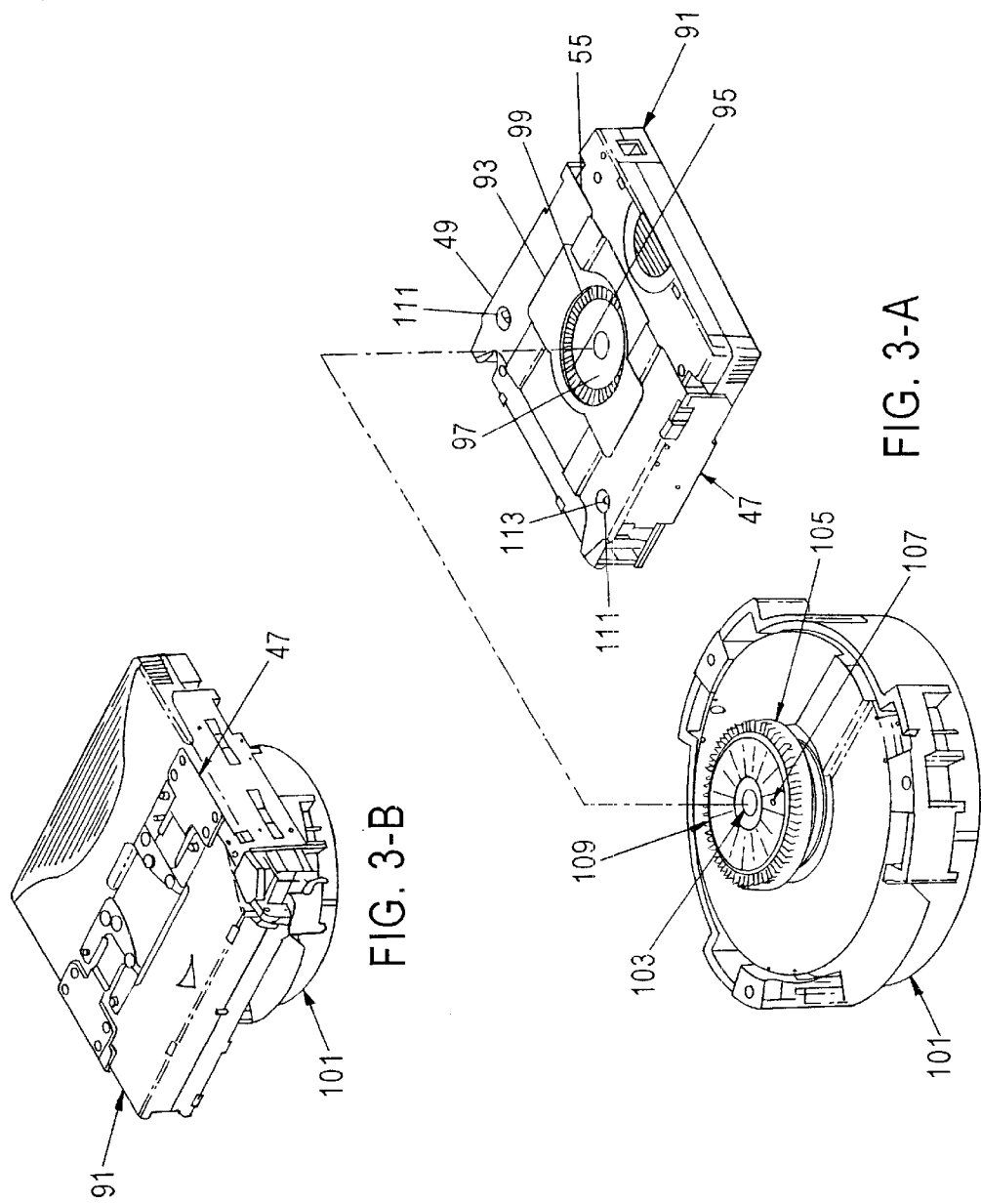

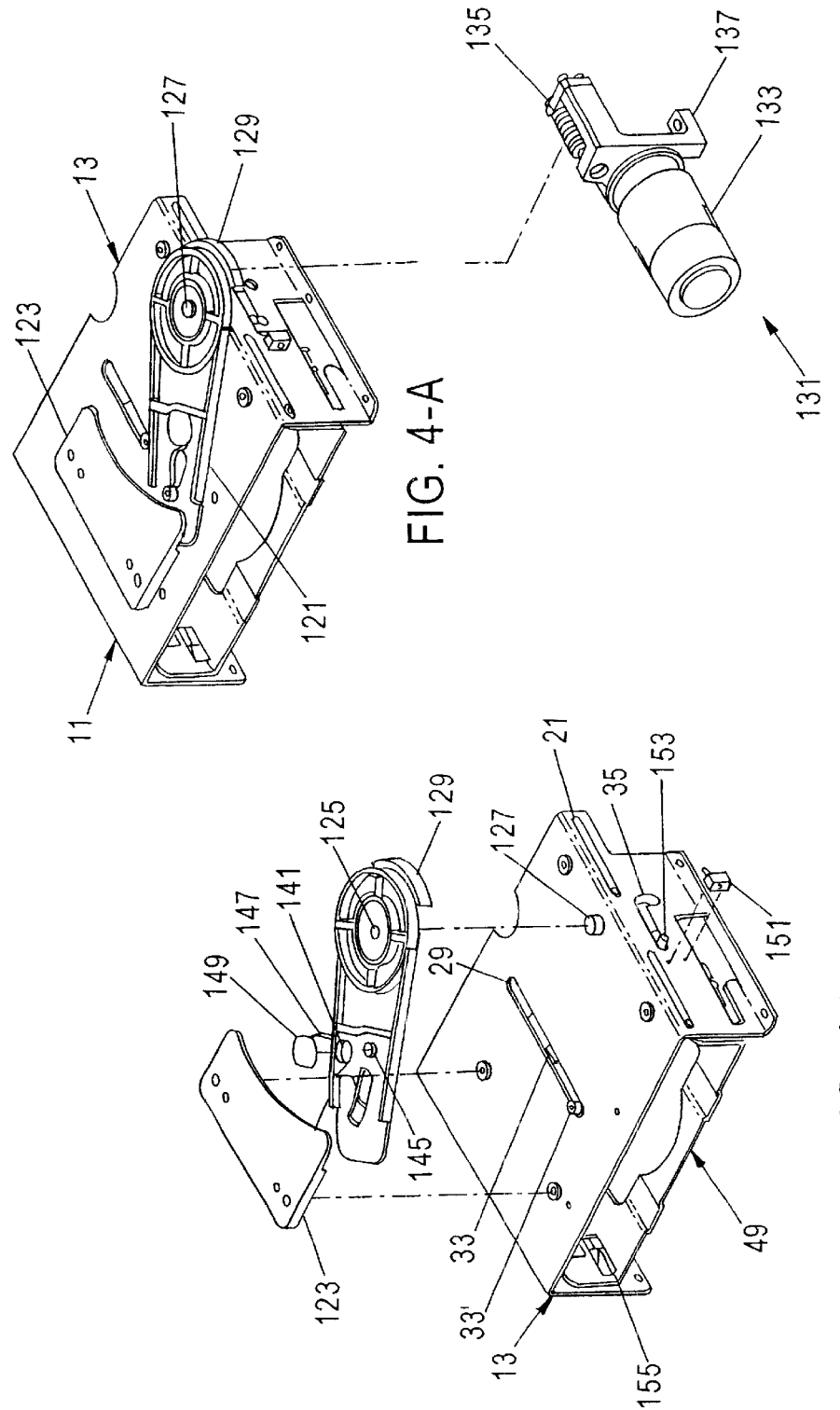

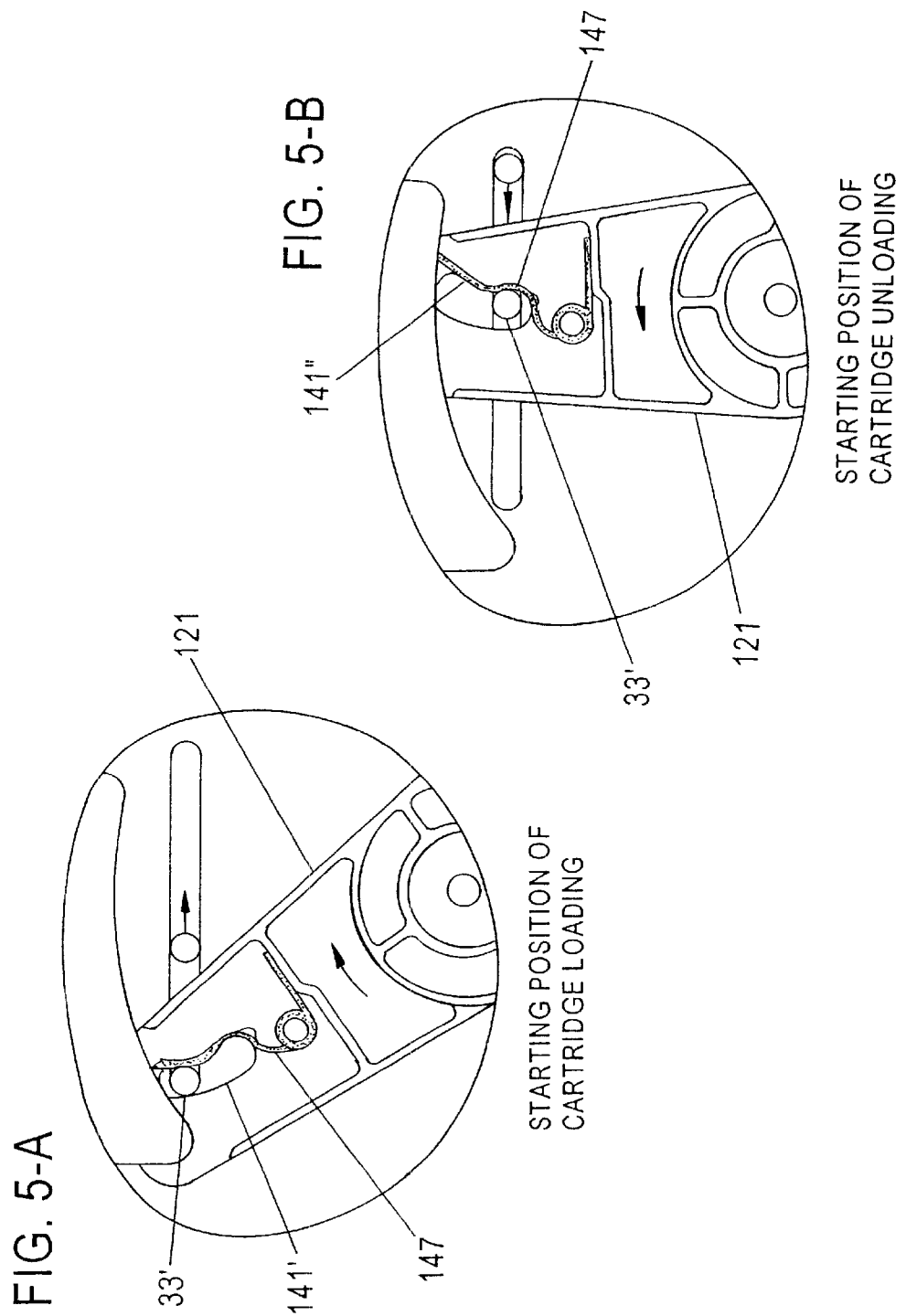

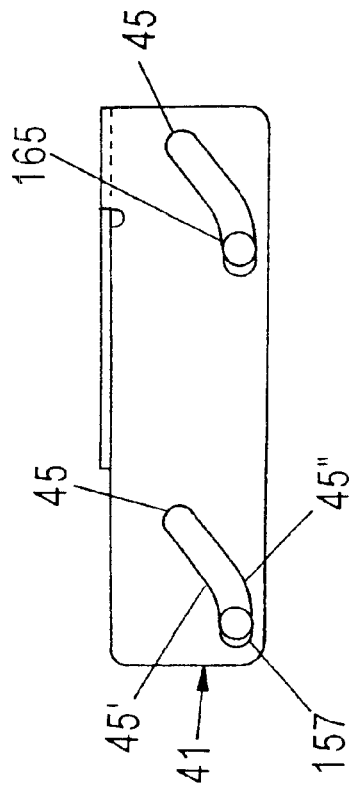
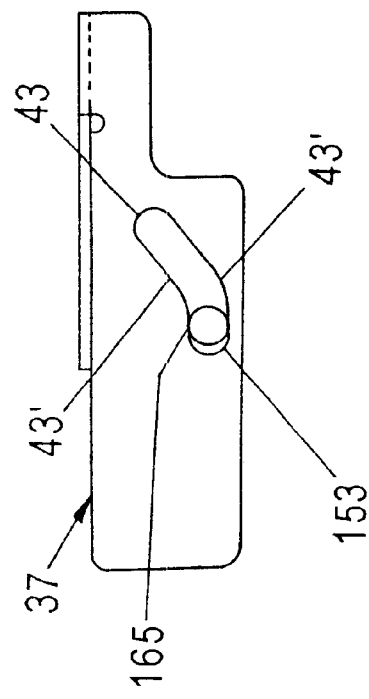
FIG. 6-A
FIG. 6-B

TECHNIQUES FOR COMPENSATING FOR HIGH INITIAL UNLOADING FORCE REQUIREMENT IN TAPE CARTRIDGE-LOADING MECHANISM

RELATED APPLICATIONS

This application claims the benefit of U.S. Provisional Application No. 60/116,014, entitled "COUNTER BALANCING SPRINGS TO COPE WITH A HIGH INITIAL FORCE REQUIREMENT IN 'VORTEX' CARTRIDGE-LOADING MECHANISM" filed on Jan. 15, 1999, by William B. Kim, the disclosure of which is entirely incorporated herein by reference.

This application also claims the benefit of U.S. Provisional Application No. 60/115,958, entitled "EMPLOYING TWO DIFFERENT SIZES OF CAM FOLLOWERS IN THE 'VORTEX' CARTRIDGE LOADER" filed on Jan. 15, 1999 by William B. Kim, the disclosure of which is incorporated herein by reference.

FIELD OF THE INVENTION

This invention relates generally to tape cartridge loader mechanisms, for example, for loading of single-reel magnetic tape cartridges into appropriate tape drives. One specific aspect of the invention relates to load balancing to offset magnetic clutch action so as to separate a tape cartridge from a tape drive. Another specific aspect of the invention relates to cam and cam follower designs for such loaders, to efficiently lift the cartridge from engagement with the tape drive motor gear.

BACKGROUND

Computers utilize a variety of magnetic media devices for the storage of software programs and data. Information recorded on the magnetic medium takes the form of flux transitions that represent the binary "1's" and "0's" that form the digital information. Tape cartridges, such as single-reel tape cartridges, are commonly used in library or other archival data storage applications. In such applications, a user or a robotic mechanism selects a tape cartridge for processing and inserts the cartridge into a tape drive coupled to a computer. In a fully automated system, a mechanism within the tape drive loads the tape from its entry point to a position in which the tape becomes accessible for read-from and write-to operations.

A variety of different size data tape cartridges are available. The drives for the different size cartridges, however, must be substantially the same size, so as to fit within a standard size slot or space available within the framework of a personal computer or the like. Larger cartridges enable storage of more data on the tape within, however, the larger the cartridge the more difficult it is to design a drive mechanism to fit within the design envelope.

For example, some single reel cartridges are 105.4 mm wide, by 102 mm long by 21.5 mm high. Such a cartridge, by itself fills a substantial portion of the design envelope for the tape drive. As a result, tape drives for this type of cartridge have utilized manual loading mechanisms. All movement and operations to load the tape cartridge into the drive, open the tape door for access to the tape leader and engage the tape drive gear to the drive motor gear have been manual in nature. A portion of the cartridge remains outside the drive, even in the fully loaded position.

Data cartridge tape drives have been developed with automatic or "soft" loading and unloading of the cartridge. However, because of the size and complexity of the loading mechanism, these automatic loaders have been used only in drives for smaller tape cartridges.

Also, automatic cartridge tape drives must be able to load and unload cartridges many times without jamming or other failures. A failure of an automatic loader mechanism may damage a tape cartridge and makes the drive unusable until repaired or replaced. Typical design parameters for drives available today call for the loader mechanism to continue to operate successfully for at least 300,000 loading/unloading cycles. For applications with frequent cartridge replacement, such as tape library systems providing access to volumes of data to many users via networks, to have a truly useful life each tape loader mechanism must operate successfully with little or no wear for many more cycles than even this design parameter.

Automatic loader mechanisms have been developed in the past that include some form of conveyor and/or shuttle mechanism to retract the cartridge entirely within the drive and lower the cartridge for engagement with the tape drive motor gear. These mechanisms are motor driven. Many cartridge tape drives use a magnet and a metal plate to form a magnetic clutch, to engage the cartridge gear to the drive gear associated with the motor. The loader motor must supply sufficient torque during unloading to overcome the magnetic clutch forces, in order to separate the cartridge from the cartridge drive motor. This imposes a high power requirement on the loader motor. To produce adequate torque typically requires a larger motor and more electrical power. The high torque also tends to wear out drive linkages quickly.

It should, therefore, be appreciated that a need exists for an automatic loading mechanism for data tape cartridges that takes up the minimum amount of space within the design envelope of the tape drive, to allow the mechanism and the drive to handle as large a cartridge as possible. Also, a need exists for a loader mechanism of this type that is particularly durable and can operate successfully for a large number of loading/unloading cycles without any jams or other failures. To meet these general needs there is a specific need for a technique to reduce the torque requirement on the loader motor needed to separate the magnetic clutch elements, to allow use of a smaller motor and reduce stress and wear on loader components.

SUMMARY OF THE INVENTION

The present invention meets the above-stated needs and overcomes the problems with prior cartridge loader systems.

The present invention relates to a loader, for automatically loading a tape cartridge into a tape drive, preferably for reading and writing data on a tape within the cartridge. The loader includes a cartridge shuttle. The shuttle receives the tape cartridge and moves to and from a position within the tape drive in which the cartridge is operatively loaded into the tape drive. The loader also includes means for producing a force to assist in separating the gear within the tape cartridge from the gear coupled to the drive motor.

The assist force may be provided by one or more load balancing springs. In addition or alternatively, the assist force may be generated by a unique cam and follower arrangement, which applies different forces on opposing sides of the shuttle at least during initial unloading motion of the cartridge.

Thus, one aspect of the present invention relates to an automatic tape cartridge loader. The inventive loader includes a shuttle for receiving the tape cartridge and means for moving the shuttle. The movement means automatically moves the shuttle to and from a position within the loader, in which a gear within the tape cartridge engages a gear coupled to a drive motor of the tape drive. In the preferred embodiments, magnetic attraction between the gears draws the two gears into secure engagement. In this aspect of the invention, the loader also includes at least one spring. The spring produces a force opposing movement of the shuttle to the cartridge-loaded position. The spring assists in movement of the shuttle from that position, during unloading, in such manner as to assist in separating the gear within the tape cartridge from the gear coupled to the drive motor. For example, when there is magnetic attraction between the gears, the spring force helps to overcome the magnetic clutch engagement between the two gears.

In the preferred embodiment, the spring actually comprises two more springs. Although a variety of arrangements are possible, the springs typically are compression springs attached to a base, for compression by the cartridge or shuttle as the shuttle moves to the cartridge-loaded position within the loader and tape drive.

The load balancing spring forces on the cartridge shuttle help to overcome the magnetic attraction and separate the gears. This reduces the torque and/or power requirement on the loader motor during the unloading operation. The loader may use a smaller motor, and the reduced torque tends to extend the useful life of the loader and motor.

The preferred embodiment of the shuttle includes cantilevered springs for applying spring force toward the tape drive motor to the cartridge within the shuttle and for buffering the cartridge within the shuttle. The cam profiles induce motion of the shuttle slightly past the cartridge-loaded position, to produce a gap between a surface of the cartridge and an adjacent surface of the shuttle. The cantilevered springs buffer the cartridge within the shuttle, when the shuttle moves past the cartridge-loaded position. Another aspect of the invention relates to a tape cartridge loader. The loader includes a conveyor and a shuttle for receiving the tape cartridge. The conveyor is mounted for linear motion. The conveyor has two sidewalls and at least one cam profile in each sidewall. The loader includes a first cam follower bearing attached to a side of the shuttle for engagement with the first cam profile and a second cam follower bearing attached to the opposite side of the shuttle for engagement with the second cam profile. The second cam follower bearing is larger than the first cam follower bearing. The first and second cam profiles are contoured so that interaction of the bearings with the first and second cam profiles during unloading of the tape cartridge from the loader provides different forces on opposing sides of the tape cartridge.

The differing forces on opposite sides of the shuttle preferably cause a lift of the cartridge that is uneven. The forces may initiate lift of each side of the shuttle and thus the cartridge at different times during the unloading operation and may result in a slight skew of the cartridge with respect to the plane of the motor drive gear. For example, in a preferred embodiment, the first and second cam profiles are contoured such that motion of the conveyor during unloading causes the first cam profile to apply force through the first cam follower bearing prior to the second cam profile applying force through the second cam follower bearing. The plane of the gear in the tape cartridge rises at an angle with respect to the plane of the drive motor gear, instead of parallel. In a tape drive having a magnetic attraction between the tape motor drive gear and the gear within the tape cartridge, these differences in the application of force on the sides of the cartridge help to overcome the magnetic attraction and separate the gears. This reduces the torque and/or power requirement on the loader motor during the unloading operation. The loader may use a smaller motor, and the reduced torque tends to extend the useful life of the loader and motor.

In the preferred embodiment, the loader also includes a frame housing. The conveyor is mounted for linear motion within the frame housing, for example by means of follower bearings attached to the conveyor that ride in one or more linear grooves in the walls of the frame housing. The frame housing may have a path constraint groove, with a first section parallel to the linear motion of the conveyor and a second section perpendicular to the first section. One of the cam follower bearings attached to the shuttle also interacts with the path constraint groove, to limit motion of the shuttle to a path defined by the path constraint groove formed in the frame housing.

In a fully automated implementation, the tape cartridge loader would also include an actuator system. This system preferably includes a rotatable actuator arm coupled to the frame housing, for inducing the linear motion of the conveyor. A motor is coupled to the actuator, for example through worm and sector gears, to drive the rotation of the actuator arm in response to a drive signal.

Another aspect of the invention relates to a tape drive incorporating the inventive cartridge loader. The tape drive includes a tape drive motor and a tape drive gear coupled for rotation by the tape drive motor. A magnet is secured to the tape drive gear for magnetically attracting a gear within the tape cartridge. The drive also includes an automatic loader, for loading the tape cartridge such that the tape drive gear engages the gear within the tape cartridge and for unloading the tape cartridge from engagement and from the tape drive.

In this aspect of the invention, the automatic loader includes a frame housing, a conveyor and a shuttle. The conveyor is mounted in the frame housing for linear motion back and forth during loading and unloading of the tape cartridge. The conveyor has sidewalls, with at least one groove formed in each sidewall. Each of these grooves has a cam profile for use in a cartridge loading operation and a cam profile for use in a cartridge loading operation. An actuator, preferably in the form of a flat rotatable arm, is coupled to the conveyor. The actuator is automatically driven so as to induce the various linear motions of the conveyor.

A first cam follower bearing, attached to a first side of the shuttle, engages the cam profiles of the first groove, and a second cam follower bearing, attached to the opposite side of the shuttle, engages the cam profiles of the second groove. The loading cam profiles of the two grooves are contoured so that interaction with the follower bearings, during tape loading, induces a motion of the shuttle for retracting the tape cartridge into the frame housing and into engagement.

The second cam follower bearing is larger than the first cam follower bearing. Also, the unloading cam profiles of the grooves are specially contoured. As a result, the interaction of the followers with the unloading profiles during unloading provides different forces on opposing sides of the tape cartridge. The differing forces on opposite sides of the shuttle assist in separation of the gear within the tape cartridge from engagement with the tape drive gear.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

FIG. 1-A is an isometric view of the loader assembly frame housing.

FIG. 1-B is an exploded isometric view of the loader assembly housing and the conveyor showing the interconnection thereof.

FIG. 2-A is an isometric view of the assembly formed by the cartridge shuttle and the flat spring assembly, from the back side.

FIG. 2-B is an exploded isometric view of the assembly formed by the cartridge shuttle and the flat spring assembly from the front (cartridge loading) side.

FIG. 3-A is a side isometric view, illustrating the interacting elements of the cartridge and the cartridge shuttle, with the shuttle and cartridge inverted to show the lowerside thereof.

FIG. 3-B is a back side isometric view showing the cartridge and the cartridge shuttle in the loaded position on top of the reel motor.

FIG. 4-A is an isometric view of the loader assembly with the shuttle conveyor actuator, from the front (cartridge loading) side.

FIG. 4-B is an exploded isometric view of the loader assembly and the shuttle conveyor actuator from the front (cartridge loading) side.

FIG. 4-C is an isometric view of the cartridge loading motor and worm gear assembly.

FIG. 5-A is a detailed view of the cam follower, the cam profile and the impact buffer spring of the shuttle conveyor actuator, at the start of cartridge loading.

FIG. 5-B is a detailed view of the cam follower, the cam profile and the impact buffer spring of the shuttle conveyor actuator, at the start of cartridge unloading.

FIG. 6-A is a detailed view of the two cam profiles of the left sidewall of the conveyor and the cam followers of the shuttle cartridge riding within those profiles.

FIG. 6-B is a detailed view of the cam profile of the right sidewall of the conveyor and the cam follower of the shuttle cartridge riding within that profile.

DESCRIPTION OF THE PREFERRED EMBODIMENTS

Figure 7:
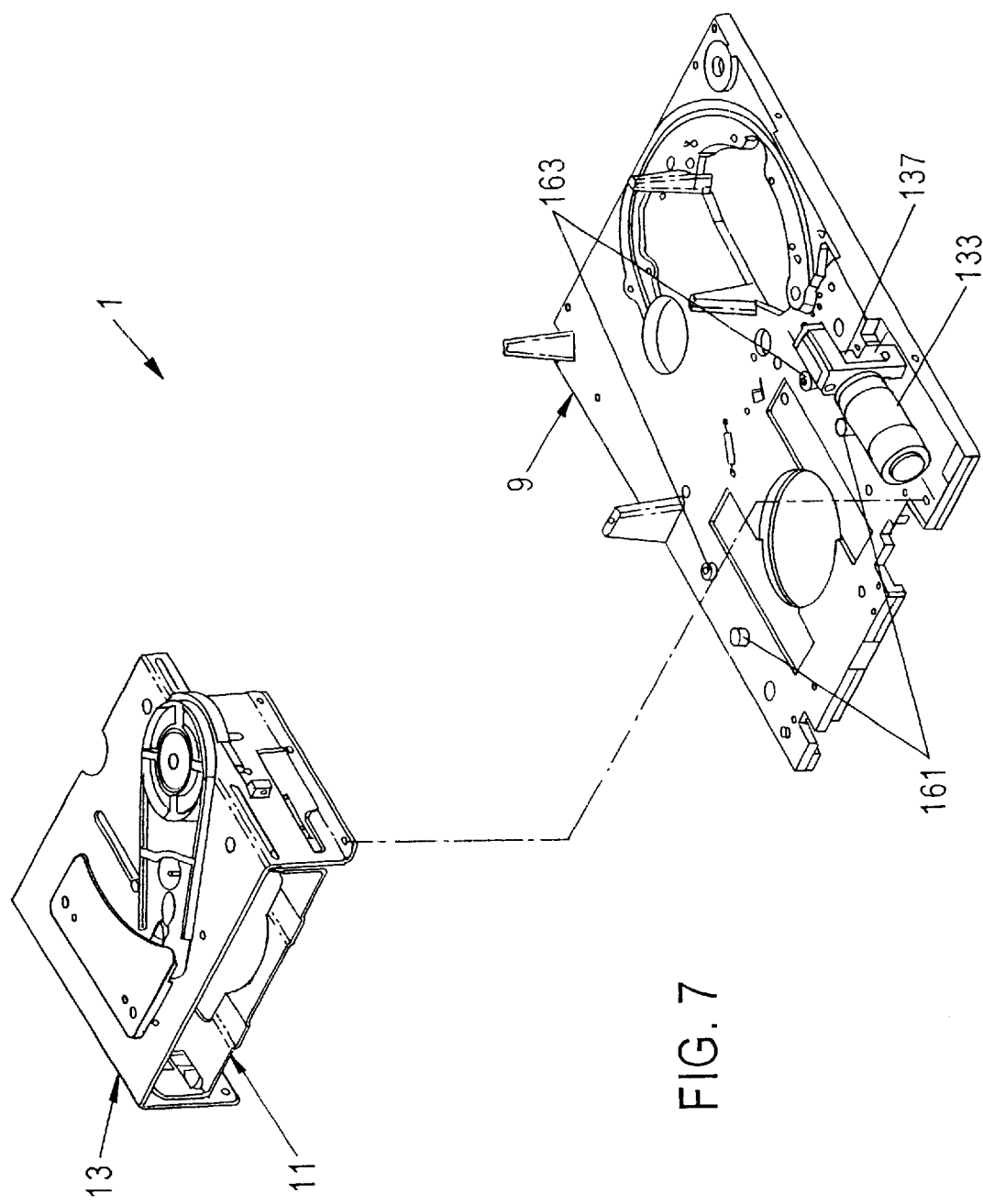
FIG. 7 is a partially exploded isometric view of the shuttle assembly, the cartridge loader motor and the tape drive base.

The several drawings depict a tape drive 1, including a base 9 and a loader assembly 11 (see e.g. FIGS. 1-B and 7). The loader assembly 11 receives a tape cartridge, for example containing a magnetic tape or other tape media for storage of digital data. In the presently preferred embodiments, the cartridge is a single-reel tape cartridge containing magnetic tape. The loader assembly 11 loads the cartridge into engagement with a drive motor and opens a door on the cartridge to provide access to a leader attached to the tape contained within the cartridge. A load arm assembly, not shown, connects to the leader and withdraws the leader for coupling to a take up reel. While so engaged, the tape from the cartridge may be repeatedly wound and rewound between the cartridge and the take up reel, while data is read from and/or written to the magnetic tape.

The tape drive 1 may be loaded manually, or the tape drive may receive a cartridge from another mechanism, for example from a robotic tape selector in a tape library system. For ease of description, the text below refers to insertion of a tape by a user. Those skilled in the art will recognize that this "user" may be a human operator or an automated device or system for selecting one of many available tapes, for example in a library of such tapes, and inserting the selected tape through a bezel opening into the tape drive.

The tape drive 1 may be orientated in any convenient direction. For purposes of discussion, it is assumed that the opening for insertion of the tape cartridge corresponds to the "front" of the drive, and the width of the opening to receive the cartridge would be horizontal. The user would insert the cartridge with a front-to-back motion. In several of the drawings, such as 1-B and 7, the base 9 and/or the loader assembly 11 of the drive 1 are shown in a position to receive the cartridge from the front, and the loader assembly 11 retracts and lowers the cartridge during loading, to engage the tape within the drive. For convenience of discussion, references to horizontal, vertical, various sides and front and back will assume such a normal orientation of the drive 1, and where appropriate to a corresponding orientation of the cartridge, as shown in those drawings. The orientations shown and the descriptive references thereto, however, are for purposes of illustration and example only.

The tape drive 1 includes a base 9 and a loader assembly 11 (FIG. 7). The loader assembly 11 comprises a frame housing 13 (FIGS. 1-A, 1-B). If the base 9 is horizontal, as shown in FIG. 7, the loader assembly frame housing 13 is secured to the top side of the base 9, for example by rivets or the like. As discussed more later, the base 9 also supports one or more springs 161 producing forces to assist in separating the cartridge from the drive motor during unloading.

With reference to FIG. 1-A, the loader assembly frame housing 13 comprises a right sidewall 15, a planar top plate 17 and a left sidewall 19. The sidewalls 15, 19 are substantially perpendicular to the top plate 17. The right sidewall 15 includes a horizontal shoulder at the bottom with two or more holes therethrough, to facilitate attachment of the sidewall to the top of the base (FIG. 7). The left sidewall includes two or more horizontal holes therethrough, to facilitate attachment to the side of the base.

Each sidewall 15, 19 of the loader assembly frame housing 13 includes two linear travel grooves 21. In the illustrated embodiment, the grooves 21 are adjacent to the top of the respective sidewall and extend parallel to the top plate 17. The conveyor includes a cam follower bearing for interaction with each of the linear travel grooves. In the illustrated implementation, these follower bearings comprise machine screws or pins and bearings mounted for rotation about the pins. A pin 23 passes through a bearing 25 and is attached to a hole in the matching sidewall of the conveyor 27. The bearings 25 are slightly smaller in diameter than the vertical height of the linear travel grooves 21. The linear grooves 21 and the associated cam follower bearings 25 provide vertical support for the conveyor 27. Each of the bearings 25 travels along one of the linear grooves 21, to provide a precise front-to-back linear travel for the conveyor 27.

The top plate 17 of the loader assembly frame housing 13 includes another linear travel groove 29. In the illustrated embodiment, the groove 29 is substantially centered in the top plate 17 between the two sidewalls 15, 19. The groove 29 is somewhat longer than the individual grooves 21. The conveyor 27 includes two cam follower bearings for interaction with the top linear travel groove 29, for example formed by pins 31 and bearings 33. A pin 31 passes through a bearing 33 and is attached to a hole in the matching top plate of the conveyor 27. The bearings 33 are slightly smaller in diameter than the width of the linear travel groove 29. The bearings 33 travel along the linear groove 29 in the top plate 17, to limit lateral movement of the conveyor during front-to-back linear travel of the conveyor 27.

As shown, the front pin 31' actually is somewhat taller than the back pin 31, and the pin 31' passes through two bearings 33, 33'. The lower bearing 33 engages the linear travel groove 29, for control of the front to back motion of the conveyor 27. As discussed more later, the upper bearing 33' forms a cam follower bearing engaging a cam profile within an actuator arm, which induces the movement of the conveyor 27. The back pin 31 and bearing 33 form a path guide bearing.

The sidewall 15 of the frame 13 includes a path constraint groove 35. The groove 35 includes a first linear section extending horizontally (parallel to the top plate 17) in the front-to-back direction along the sidewall. A second linear section, at the back of the groove, extends vertically downward.

The conveyor 27 comprises a right sidewall 37, a top plate 39 and a left sidewall 41. The sidewalls 37, 41 are substantially perpendicular to and extend vertically downward from the top plate 39. The sidewalls of the conveyor 27 include inclined cam profiles 43, 45. Specifically, the right sidewall 37 includes one inclined cam profile 43, approximately mid-way from front to back along the wall, for raising and lowering the cartridge shuttle (shown in other drawings). The left sidewall 41 includes two cam profiles 45, for use in raising the left side of the cartridge shuttle.

The linear grooves 21, 29 and associated cam follower bearings coupled to the conveyor 27 enable front-to-back linear motion of the conveyor within the loader assembly frame housing 13. In a preferred embodiment, the conveyor moves 31.4 mm horizontally. The inclined cam surfaces 43, 45 in the sidewalls 37, 41 of the conveyor 27 produce a vertical movement of the cartridge shuttle assembly. The cam follower bearing engaging the inclined cam profile 43 also engages the path constraint groove 35 in sidewall 15. The groove 35 controls the direction and extent of travel of the cartridge shuttle during loading and unloading operations.

FIGS. 2-A and 2-B illustrate the structure of the cartridge shuttle assembly 47. FIG. 2-A is an isometric view from the back of the assembly, whereas FIG. 2-B is an isometric view from the front of the assembly. This assembly 47 essentially comprises two elements, the cartridge shuttle 49 and a flat spring assembly 51.

The cartridge shuttle 49 comprises a right sidewall 53, a planar bottom plate 55 and a left sidewall 57. The sidewalls 53, 57 are substantially perpendicular to and extend vertically upward from the bottom plate 55. As shown in FIG. 2-B, the left sidewall 57 of the cartridge shuttle 47 includes two extruded features 59, which extend toward the center of the shuttle assembly 47. As the user inserts a tape cartridge into the shuttle, the extruded features 59 engage the left side of the tape cartridge and push the cartridge toward the right side of the cartridge shuttle assembly 47. Essentially, the features 59 serve to justify the cartridge to the right, during loading of the cartridge into the drive. The features 59 maintain the cartridge in the justified position throughout loading, data read/write operations and unloading of the tape from the tape drive.

The back end of the bottom plate 55 includes two extensions near the left and right edges of the plate. These extensions include vertical projections 61, which serve as cartridge stops. When the user inserts the cartridge, the user pushes the cartridge from front-to-back inside the tape cartridge shuttle assembly 47. The projections or stops 61 limit the travel of the cartridge from front-to-back into the tape cartridge shuttle assembly 47.

Each sidewall 53, 57 connects to an attachment plate 63, 65 bent back at right angles to the sidewalls toward the top-center section of the shuttle assembly 47. Each of the attachment plates includes four holes for receiving rivets 66, to secure the flat spring assembly 51 to the cartridge shuttle 49.

The attachment plate 65 extends somewhat more to the rear of the assembly 47 (FIG. 2-B), to allow attachment of a sensor switch support 67 (FIG. 2-A). The sensor switch support 67 in turn supports a cartridge-in sensor switch 69 with a flexible cable guide 71 for the electrical cable connection to the switch. When the user inserts the cartridge, the user pushes the cartridge from front-to-back inside the assembly 47 until the cartridge engages the stops 61. As the cartridge approaches the stops 61, it also actuates the sensor switch 69. The switch 69 provides a signal to the drive control circuitry (not shown) indicating insertion of a cartridge and triggering actuation of the loader motor assembly, as discussed more later.

The right sidewall 53 includes a bent feature 73 extending inwards from the back edge of the wall. The feature 73 is positioned along the wall 53 and extends inward an appropriate distance, so as to engage a sliding tape door on the right side of the tape cartridge. As the cartridge enters the shuttle and travels to the back thereof, the feature 73 engages and pulls the tape door of the cartridge toward the rear of the cartridge. This opens the tape door of the cartridge, and enables access to the tape leader pin by a load arm assembly (not shown).

Near the lower front corner, each sidewall 53, 57 includes a rectangular opening 74, which extends somewhat into the bottom plate 55. The openings 74 enable mounting of flat springs and extension of the springs into the interior of the cartridge shuttle assembly 47. The springs (one of which appears in a later drawing) engage notches in the tape cartridge.

Consider now the flat spring assembly 51. As noted, this assembly 51 is mounted across the top of the cartridge shuttle 49. The spring assembly 51 includes a front tip 75 for vertically guiding the cartridge as the user inserts the cartridge through a bezel opening (not shown) into the tape drive. The assembly 51 includes a plate 77 for actual attachment of the spring assembly 51 to the plates 63, 65 associated with the sidewalls of the cartridge shuttle 49 by the rivets 66. The plate 77 in turn supports four cantilevered flat springs 79. Two of the springs 79 extend to the right of the assembly 51, along the front and the back of the assembly (FIG. 2-B). The other two springs 79 extend to the left of the assembly 51, along the front and the back of the assembly. Each spring 79 includes a cartridge pressure button 81 extending down through the distal end of the spring. The buttons 81 contact the top surface of a cartridge when contained within the cartridge shuttle assembly 47. The buttons 81 transfer spring pressure downwards from the cantilevered flat springs 79 to the cartridge, to assist in engaging the tape reel of the cartridge with the tape chuck of the drive motor and to buffer the cartridge vertically within the shuttle, as discussed more below.

The cartridge shuttle assembly 47 together with the conveyor 27 receive the cartridge, and they enable horizontal and vertical motion from the position where the cartridge passes through the bezel opening into the tape drive to the cartridge-loaded position where the tape reel engages the drive motor chuck and the actual tape may be withdrawn from the cartridge for data read/write operations. To facilitate this motion, the sidewalls 53, 57 include attachment holes 83, for attachment of cam follower bearings to the assembly 47. As visible in the front isometric view of FIG. 2-B, the right sidewall 53 includes a single attachment hole 83 approximately mid-way along the sidewall, for attachment of a cam follower bearing to engage the cam profile 43 of the right sidewall 37 of the conveyor 27 as well as the path constraint groove 35 in the right sidewall 15 of the frame housing 13. As visible in the rear isometric view of FIG. 2-A, the left sidewall 57 includes two attachment holes 83. These two holes enable attachment to the cartridge shuttle 49 of cam follower bearings to engage the inclined cam profiles 45 of the left sidewall 41 of the conveyor 27.

FIG. 3A shows a tape cartridge 91 inserted in the cartridge shuttle assembly 47. In this drawing, the tape cartridge and the shuttle assembly are turned upside down, to show the underside thereof. As shown, the bottom plate 55 of the cartridge shuttle 49 includes an opening 93. The opening 93 extends laterally across the central portion of the bottom plate and provides access to the bottom of the cartridge 91, specifically to the central drive gear 95 of the tape cartridge. The drive gear 95 is coupled to the bottom of the tape spool within the cartridge 91. The drive gear 95 comprises a metal or magnetic plate 97 around the coupling to the central shaft and downwardly extending gear teeth 99 around the periphery of the gear. The material of the plate 97 is such as to enable attraction of the cartridge drive gear to a magnet within the motor gear.

FIG. 3A also depicts the tape drive motor 101. As shown, the motor includes a vertical drive shaft 103, driven to rotate by the electromagnetic components of the motor. A motor drive gear 105 is secured to the upper end of the drive shaft 103. The motor drive gear 105 includes a ring-shaped magnet 107 about the end of the shaft 103 and a ring of upwardly extending gear teeth 109 around the periphery of the gear. The size of the teeth 109 and the diameter of the ring of teeth 109 correspond to those of the gear teeth 99 on the cartridge drive gear 95, to enable the two sets of teeth to mesh when the cartridge is in its loaded position.

The magnet 107 on the motor drive gear 105 interacts with the plate 97 of the cartridge gear 95, as the shuttle assembly 47 lowers the cartridge 91 to the position shown in FIG. 3B, to provide a magnetic clutch action. The magnetic force between the magnet 107 and the plate 97 pulls the cartridge gear 95 toward the motor drive gear 95 to provide a positive mesh between the two sets of peripheral gear teeth 99, 109.

FIG. 3A shows two additional openings 111 near the back corners of the bottom plate 55 of the cartridge shuttle 49. When a cartridge 91 is fully inserted into the shuttle assembly 47, as shown, the openings 111 provide access to small holes 113 formed in the bottom of the cartridge 91. These holes are used for registration with features on the base plate, as the loader assembly lowers the cartridge into its full, operational position, as discussed more later with regard to FIG. 7.

FIGS. 4-A to 4-C illustrate the elements of the automatic actuator system, for producing the linear back and forth movements of the conveyor. FIG. 4-A depicts the loader assembly 11 with the shuttle conveyor actuator arm 121 and the actuator guide 123 mounted on the top of the frame housing 13. The actuator arm 121 includes a bearing opening 125 (FIG. 4-B). The bearing opening 125 is sized slightly larger than the pivot pin 127, securely attached to the top of the frame housing 13 (FIG. 4-B). The pivot pin 127 and opening 125 form a bearing enabling rotational motion of the arm 121 about the axis of the pin and opening. Surrounding regions of the arm include raised bosses, to insure adequate strength and rigidity.

The actuator arm 121 is a relatively flat member extending from the pivot axis across the top of the frame housing 13. The flat construction of this arm minimizes the vertical space occupied by the means for actuating the conveyor in response to the motive force of the loader motor assembly.

The portion of the periphery around the end of the arm 121 centered about the axis of the pin and opening is semicircular. Along a portion of the semicircular end of the arm 121, the arm includes a series of sector gear teeth 129. The sector gear teeth extend out radially, to edges that are substantially vertical.

FIG. 4-C presents an isometric view of the loader motor assembly 131. The assembly 131 includes an electromagnetic motor 133, a gear reduction box, an encoder, a gear train and a worm gear 135. The assembly also includes a bracket 137 for securely attaching the assembly 131 to the base (see FIG. 7). The teeth of the worm gear 135 essentially form a screw, which rotates about a horizontal axis. The motor 133, gear reduction box, and gear train drive the worm gear 135 to rotate about its axis. The gear 135 may rotate clockwise or counterclockwise about its axis, depending upon the drive signals applied to the motor 133, to drive the various operations of the loader assembly 11.

When assembled, the teeth of the worm gear 135 of the motor assembly 131 engage the sector gear teeth 129 on the periphery of the end of the actuator arm 121. The motor assembly 131 rotates the worm gear 135, and the interaction between the teeth of the gear 135 and the teeth of the gear 129 causes the actuator arm 121 to rotate about the pivot axis formed by the pin 127 and the opening 125.

Rotation of the worm gear 135 in a first direction will cause the actuator arm 121 to rotate about its axis in a clockwise direction (when viewed from the top as in FIG. 4A). For example, during a loading operation, this drive operation would move the actuator arm from the position shown in FIG. 4A to a position around to the right. Later rotation of the worm gear 135 in a second direction will cause the actuator arm 121 to rotate about its axis in a counterclockwise direction to drive the actuator arm back to the position shown in FIG. 4A, to unload a cartridge.

The actuator guide 123 is mounted on the top plate of the frame housing 13. The front and back ends of the guide 123 include bosses, to support the guide at a distance above the top plate 17 of the housing frame 13. A leading edge of the actuator guide 123 extends to the right, above the path of travel of the distal or radial end of the actuator arm 121. Adjacent to the groove 141, the radial end of the arm 121 travels in the space formed between the top of the frame housing 13 and the underside of the guide 123. The guide 123 limits any possible upward movement of that end of the arm 121, to prevent twisting of the arm during its movement to load and unload cartridges from the tape drive 1.

The top surface of the guide 123 is the actual top of the loader mechanism. The actuator arm 121 and the guide 123 provide a particularly low profile and make efficient use of space within the design envelope for the drive.

As shown by the discussion above, the drive motor assembly 131 drives the actuator arm 121 to rotate. The conveyor 27, however, moves in a linear direction along the front-to-back axis of the loader assembly 11. To convert the rotation of the actuator arm 121 to a linear motion for driving the conveyor 27, the arm 121 includes a curved groove 141. The front and back edges of the groove 141 form cam profiles for cartridge loading and unloading. The groove is wider than the diameter of the associated cam follower bearing so that when the bearing follows one edge or profile of the groove there is a gap between the bearing and the opposite edge of the groove.

FIG. 4-B shows the cam follower bearing 33' attached to the conveyor, for interaction with the edges of the groove 141. The lower bearing 33 on the front pin and the back bearing 33 interact with the linear travel groove 29, as discussed above relative to FIG. 1-B. The camming action of the edges of the groove 141 moves the follower bearing 33' back and forth in a linear fashion along the groove 29 in the top plate 17 of the frame housing 13. This motion of the follower 33' in turn induces linear movements of the conveyor 27.

The actuator arm 121 includes a pivot 145, projecting upwards from the upper surface of the arm near one end of the groove 141. The arm 121 also supports a torsion spring 147, which serves as an impact buffer. The coil of the impact buffer spring 147 fits around the outside of the pivot 145. A retainer 149 attaches to the pivot 145 to hold the spring 147 in place. The retainer is a flat member threaded on the bottom for attachment to matching threads of the pivot 145. The retainer has flat sides to enable a technician to turn the retainer to attach or detach it from the pivot. This design of the retainer minimizes the height thereof, to keep the loader mechanism within height constraints for the design profile of the drive.

In the preferred embodiments, the bottom, the left and right sides, and the back of the drive 1 are enclosed by a housing (not shown). Because of the small height allowed for the drive, the housing does not cover the arm 121 and the guide 123 on the top of the loader.

FIGS. 4-A and 4-B also show the interaction of the home position sensor switch 151 with the cam follower bearing 153 attached to the shuttle. Specifically, the frame housing 13 supports an attached micro-switch 151 near the front end of the horizontal section of the path constraint groove 35 (FIG. 4-B). The home position sensor switch 151 provides a control signal to stop the loader motor operation when it detects the cam follower 153 attached to the shuttle approaching the front end of the groove 35, at the end of an unloading operation.

In FIG. 4-B, one of the two flat springs 155 is visible through the sidewall opening 74 (FIG. 2-B). The springs 155 register with notches in the lower side edges of the tape cartridge housing, when the tape is fully inserted into the shuttle assembly.

FIGS. 5-A and 5-B show the interaction of the groove 141, the cam follower bearing 33' and the spring 147 in somewhat more detail. The spring 147 comprises two arms extending outward from the coil about the spring pivot. One arm engages a boss formed on the top of the actuator arm and remains relatively stationary with regard to the arm and the pivot. The other arm extends from the coil outward essentially along the radial dimension of the arm 121. The coil of the spring 147 is dimensioned such that the spring applies a counterclockwise force. This force normally biases the follower bearing 33', and thus the conveyor 27 back toward the bezel opening. The spring 147 serves as an impact buffer, to absorb at least some of the force if any imparted to the conveyor by insertion of a tape cartridge through the opening into the drive.

The contour of the arm of the spring is carefully designed as shown to maintain direct contact with the bearing 33' as the bearing moves along the cam profile edges of the groove. As shown in FIG. 5-A, the spring 147 normally biases the cam follower bearing 33' forward against the cam profile formed by the front edge 141' of the groove. This front edge 141' serves as the cam profile during clockwise rotation of the actuator arm 121 to load a tape cartridge into the drive. The cam profile 141' pushes the follower bearing 33'. Specifically, as the arm 121 rotates from the position shown in FIG. 5-A, the follower bearing 33' engages the edge 141' and moves to the right as shown by the arrow. The force on the follower bearing during the loading operation is controlled by the cam profile of the edge 141'. As the bearing 33' follows the profile edge 141', the bearing 33' also engages and moves inward along the contour of the moveable arm of the spring 147. The serpentine contour of the edge 141' is carefully designed so that as the arm 121 rotates clockwise the edge 141' maintains a constant 90° contact and pressure with respect to the circumferential surface of the follower bearing 33'. The arm of the spring 147 maintains similar 90° contact with the follower bearing 33'.

FIG. 5-B illustrates engagement of the follower bearing 143 with the back edge 141" of the groove, during movement of the actuator arm 121 to unload the tape cartridge from the drive. Both the cam profile 141" and the spring 147 push the follower bearing 33' during unloading. As the arm 121 rotates counterclockwise, to the left from the position shown in FIG. 5-B, the follower bearing 33' engages the edge 141" and moves back to the left as shown by the arrow. The force on the follower bearing during the unloading operation is controlled by the cam profile of the edge 141" and the tension of spring 147. As the bearing 33' follows the profile edge 141", the bearing 33' also engages and moves outward along the contour of the moveable arm of the spring 147. The profiles of the edge 141" and of the arm of the spring 147 are designed to push the circumference of the follower bearing 33' with a 90° force angle, throughout the counterclockwise movement of the actuator arm. When the actuator arm 121 stops moving counterclockwise (position shown in FIG. 5-A), the force of the spring 147 returns the follower bearing 33' to the position where it engages the front edge 141' of the groove, for the next subsequent cartridge loading operation.

Hence, the operation of the loading motor assembly 131 causes the actuator arm 121 to rotate, and the cam profiles of the groove 141 move the follower 33' and the attached conveyor 27 back and forth along a linear path during loading and unloading operations. The direct perpendicular (90°) engagement of the cam profiles and the spring arm to the cam follower bearing maximizes the force transferred from the actuator arm to the conveyor. The tape cartridge shuttle is supported by follower bearings in cam profile grooves in the conveyor. The cam profiles together with the path constraint groove in the frame housing serve to convert the linear movement of the conveyor into a right angle movement of the shuttle and the cartridge within the shuttle. For example, during the loading operation, this right angle movement moves the shuttle and cartridge back into the drive and down into the operational position.

FIGS. 6-A and 6-B depict the cam profile and follower arrangement, including the cam profiles 43, 45 formed within the sidewalls 37, 41 of the conveyor 27 and the associated follower bearings. Both drawings depict the cam profiles as if viewed from the right side. Each cam profile comprises an angled groove, with a short section having a low pressure angle, a bend and a somewhat longer inclined section. In each case, the upper edge 43' or 45' of the groove serves as the cam profile engaging the corresponding cam follower bearing during loading of a tape cartridge. The lower edge 43" or 45" of the groove serves as the cam profile engaging the corresponding cam follower bearing during unloading of a tape cartridge.

The two grooves 45 forming the cam profiles in the left sidewall (FIG. 6-A) have the same dimensions, specifically to facilitate a camming action with a 4 mm diameter cam follower bearing 157. The groove 43 forming the cam profile in the right sidewall (FIG. 6-B) has a similar contour, but this groove is wider so as to interact with a 5 mm diameter cam follower bearing 153.

The contour of right side conveyor wall 37 includes a notch enabling access through the tape door of the cartridge. Consequently, the wall 37 only has room for one groove 43. To carry the requisite load, the bearing 153 is larger than the bearings 157. To accommodate the larger bearing, the groove 43 is larger than the grooves 45. As a result, the edges 43', 43" present somewhat different cam profiles than do the edges 45', 45".

As the actuator arm moves the conveyor back into the frame housing during a loading operation, the frame sidewalls 37, 41 move from left to right in the orientation shown in FIGS. 6-A, 6-B. Initially, the path constraint groove 35 causes the cam follower bearing 153 on the shuttle to move laterally. However, when the follower bearing 153 reaches the end of the horizontal section of the groove 35, the follower bearing 153 can begin to move downward, and the upper edge 43' of the cam groove 43 in the conveyor sidewall 37 becomes an effective cam profile. Similarly, the upper edges 45' of the grooves 45 become effective cam profiles driving the follower bearing 157. As the actuator arm continues to move the conveyor 27 toward the back of the tape drive, the cam profiles 43', 45' drive the follower bearings 153, 157 attached to the cartridge shuttle 49 downward. The path constraint groove 35 now limits the movement of the shuttle to a direct vertical drop, and the shuttle lowers the tape cartridge into its loaded position on top of the tape drive motor. As the shuttle reaches the end of its linear travel, the cam profiles 43', 45' push the follower bearings 153, 157 to positions essentially as shown in FIGS. 6-A and 6-B.

The three loading cam profiles formed by the grooves 43, 45 shown in FIGS. 6-A and 6-B lower the cartridge relatively evenly, to a position of flat engagement of the drive gear within the cartridge to the drive gear on the motor. However, because of the different dimensions of the cam follower bearings 153, 157 and the attendant different contours of the back edges 43", 45" of the grooves, the cam action and attendant lift forces during unloading are different on each side of the cartridge shuttle. Specifically, as the actuator arm 121 moves the conveyor 27 back toward the front of the drive (right to left in FIGS. 6-A, 6-B), the trailing edges 45" of the smaller grooves 45 in the left sidewall 41 engage the smaller diameter follower bearings 157 first. As such, the left wall of the conveyor 27 applies an upward force to the left side of the shuttle 49 before any upward force is applied to the right side of the shuttle. This produces a torque or twist on the cartridge 91, and the plane of the plate is not lifted in parallel to the plane of the magnet, so as to help separate the plate in the cartridge drive gear from the magnet in the motor drive gear. As the conveyor motion continues, the trailing edge 43" of the larger groove 43 in the right sidewall 37 engages the larger diameter follower bearing 153 to lift the right side of the shuttle. Further movement of the conveyor lifts the shuttle and cartridge along the path defined by the path constraint groove 35. Still further movement of the conveyor then moves the shuttle and cartridge laterally back toward the bezel opening as constrained by the groove 35, to complete the unloading operation.

FIG. 7 shows the base 9 and the loader assembly 11 of the tape drive 1 in an exploded view. This view also illustrates two aspects of the invention incorporated into the base 9.

First, the base 9 includes two load balancing springs 161. These springs engage the bottom surface of the tape cartridge shuttle, when the shuttle and cartridge are lowered into the fully loaded position. The lowering of the shuttle compresses the load balancing springs 161. The compressed springs apply an upward force to the shuttle. When the actuator begins to raise the shuttle, the spring forces assist in raising the shuttle and separating the plate in the cartridge drive gear from the magnet in the motor drive gear.

The springs 161 also create a force opposing lowering of the shuttle and cartridge into the final position. The cam profiles 43', 45' for loading include small regions 165 (FIGS. 6-A, 6-B) to overcome this force. Specifically, each of these cam profiles includes a region 165 that extends adjacent the bend. Each region 165 has a low pressure angle. These regions of the cam profiles apply forces to the cam followers to overcome the highest reaction from the springs 161 after the magnetic attraction ends during lowering of the cartridge, e.g. after the metal plate engages the magnet. The camming by the regions 165 also overcomes pressure forces of the cantilevered springs 79 to separate the bottom plate of the shuttle from the lower surface of the cartridge.

FIG. 7 also shows two features extending upward from the base 9. Preferably, these extruded features 163 are substantially conical, with narrower ends upward. The features are located on the base to engage the holes 113 formed in the bottom of the cartridge 91 (FIG. 3-A). Registration of the conical features in the holes 113 serves to accurately align the tape cartridge in its lowermost position.

It may be helpful to consider the sequence of operations involved in loading a tape cartridge 91 into the tape drive 1. Initially, a user or an automated mechanism inserts the tape cartridge through a bezel opening (not shown) into the tape drive 1. Specifically, the cartridge 91 is inserted and pushed to the back of the cartridge shuttle 49. The extruded features 59 in left sidewall 57 of shuttle 49 push the cartridge to the right side of the shuttle 49. As the cartridge 91 is forwarded into the shuttle 49, bent feature 73 extending inwards from the back of the right sidewall 53 engages the tape-protecting door and slides the door toward the rear of the cartridge. This opens the door, exposing a leader pin attached to the end of the recording tape, making the pin accessible to a grabbing feature in the load arm assembly.

As the cartridge is pushed into the shuttle 49 and approaches its proper location, the flat springs 155 apply pressure and eventually the flat springs 155 engage notches in the lower edges of the cartridge. The front of the cartridge 91 also engages the stops 61. The cantilevered springs 79 apply downward pressure on the cartridge. The cartridge is now in a stable position for transport. The insertion of the cartridge also engages the cartridge-in sensor switch 69, which triggers the loader motor assembly 131.

The motor 133, gear reduction box, and gear train drive the worm gear 135 to rotate about its horizontal axis, and the worm gear 135 engages the teeth of the gear 129 to rotate the actuator arm 121 clockwise about the vertical pivot axis formed by the pin 127 and the opening 125 (see FIG. 4-A). As the actuator arm 121 rotates, the front edge 141' of groove 141 makes normal contact (90° pressure angle) with the follower bearing 33' attached to the top of the cartridge conveyor 27 (FIG. 5-A). The rotational movement of the arm 121 therefore produces a linear movement of the conveyor 27 back into the tape drive 1.

The linear motion of the conveyor 27 initially induces a linear motion of the tape cartridge shuttle assembly 47 along the path constraint groove 35 in the frame housing 13. However, after the cam follower bearing 153 attached to the tape cartridge shuttle 49 reaches the end of the horizontal portion of the groove 35, the inclined cam profiles 43', 45' formed in the side plates of the conveyor induce a downward vertical movement of the tape cartridge shuttle assembly 47.

As the shuttle lowers the cartridge, the conical features 163 on the base 9 (FIG. 7) engage the holes 113 in the bottom of the cartridge (FIG. 3-A), to accurately align the tape cartridge in its lowermost position. Also, the ring-shaped magnet 107 of the motor drive gear 105 exerts a magnetic attraction force on the metal plate 97 in the central drive gear 95 of the tape cartridge, to pull the teeth 99, 109 of these two gears into a positive mesh. The cantilevered springs 79 also provide downward pressure to help position the cartridge in full engagement with the motor and base, and those springs provide some vertical buffering of the cartridge in the fully engaged position with respect to the cartridge shuttle assembly 47.

The regions 165 of the cam profiles apply the final pressure on the shuttle to offset the upward forces created by the springs 161 and the cantilevered springs 79. The regions 165 apply sufficient force to continue movement of the shuttle 49, even after engagement of the gears and after the cartridge comes to rest. This continued downward motion of the shuttle achieves a small separation (e.g. 0.3 mm) between the lower plate 55 of the shuttle 49 and the bottom of the cartridge. The regions 165 have a low pressure angle and may be slightly curved, to achieve a high force for a short throw or travel of the conveyor 27 relative to the cam followers 153, 156 and the shuttle 49. The high force is needed to overcome the sum of the various spring forces.

After this lowering of the shuttle and the cartridge, the loader motor assembly 131 stops, and the movement of the actuator arm 121, the conveyor 27 5 and the shuttle assembly 47 stops. The tape cartridge is in the fully loaded position. The leader pin attached to the end of the magnetic tape within the cartridge is accessible through the open tape door. A grabbing feature of the load arm assembly (not shown) grabs the leader pin and draws the pin to the center of the take-up reel (also not shown). The data read/write process may now commence.

It also may be helpful to consider the sequence of operations involved in unloading a tape cartridge from the tape drive 1. A control signal causes the tape drive motor 101 to rewind the tape into the cartridge, and the leader pin is released from the take-up reel and the load arm assembly. A control signal is then applied to the loader motor assembly 131. This signal causes the motor 133, gear reduction box, and gear train drive the worm gear 135 to rotate in the opposite direction about its horizontal axis.

The magnetic attraction between the metal plate 97 and the magnet 107 creates a force opposing the initial lifting of the cartridge 91. This places a high torque requirement on the loader motor. The invention provides two different mechanisms to help offset this torque requirement. First, the compression springs 161 produce a force tending to separate the cartridge from the drive motor and thus to separate the plate 97 and the magnet 107 within the gears 99, 109. Second, the unloading cam profiles 43, 45 and the associated cam follower bearings 153, 157 are designed to twist the cartridge somewhat during initial lifting, so that the two planes of the plate 97 and the magnet 107 are not parallel, and thus are easier to separate.

Continuing with the discussion of the unloading operation, the worm gear 135 engages the teeth of the gear 129 to now rotate the actuator arm 121 counterclockwise about the vertical pivot axis formed by the pin 127 and the opening 125 (FIG. 4-A). As the actuator arm 121 rotates, the back edge 141" of groove 141 makes normal contact (90° pressure angle) with the follower bearing 33' attached to the top of the cartridge conveyor 27 (FIG. 4-B). This rotational movement of the arm 121 therefore produces a linear movement of the conveyor 27 from the back of the tape drive 1 toward the front of the drive.

The forward linear motion of the conveyor 27 causes the trailing edges 45" of the smaller grooves 45 in the left sidewall 41 to engage the smaller diameter follower bearings 157 first (FIG. 6-A). This produces an upward force on the left side of the shuttle assembly 47 and the tape cartridge, causing a torque on the cartridge, to help separate the metal plate 97 in the cartridge drive gear 95 from the magnet 107 in the motor drive gear 105. To further assist in separation of the gears and overcoming the magnetic attraction, the two compression springs 161 on the base 9 apply upward forces to the bottom of the shuttle 49. As the linear movement of the conveyor 27 continues, the trailing edge 43" of the larger groove 43 in the right sidewall 37 engages the larger diameter follower bearing 153 to lift the right side of the shuttle 49 (FIG. 6-B). Further movement of the conveyor 27 lifts the shuttle 49 and the cartridge 91 along the path defined by the path constraint groove 35. Still further movement of the conveyor then moves the shuttle and cartridge laterally back toward the bezel opening as constrained by the groove 35. When the conveyor 27 and the shuttle assembly reach the end of their range of travel toward the front of the drive, the cam follower 153 trips the home position switch 151, and operation of the motor 133 stops. At this point, the motion of the actuator arm, the conveyor 27 and the shuttle assembly 47 stop, and the cartridge is accessible through the bezel opening so as to allow a user or a mechanism to withdraw the cartridge.

As shown by the drawings and the above discussion, the automatic tape cartridge loader mechanism of the present invention provides an effective system for loading and unloading cartridges, while minimizing the space occupied by the loader. The loader illustrated in the drawings is only slightly larger than the tape cartridge itself. The inventive arrangement of load balancing springs assists in separating the gears, overcoming magnetic forces of engagement, and reducing torque requirements during unloading. The springs, however, require minimal space within the design envelopes of the drive and its loader mechanism.

The inventive tape loader also is quite durable and has a long service life. A loader mechanism in accord with the invention was designed for a useful life of at least 300,000 loading/unloading cycles. An actual test unit has completed over 1,500,000 cycles without jam or failure and has exhibited virtually no component wear.

Those skilled in the art will recognize that the present invention admits of a number of modifications, within the spirit and scope of the inventive concepts. While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. An automatic tape cartridge loader, for loading a tape cartridge into a tape drive for reading and writing of data on a tape within the cartridge, the tape loader comprising:
   a shuttle for receiving the tape cartridge;
   means for automatically moving the shuttle to and from a position within the loader in which a gear within the tape cartridge engages a gear coupled to a drive motor of the tape drive;
   a base; and
   a pair of compression springs mounted on the base for compression between the shuttle and the base by movement of the shuttle to said position, for producing a force opposing movement of the shuttle to said position and assisting movement of the shuttle from said position in such manner as to assist in separating the gear within the tape cartridge from the gear coupled to the drive motor.

2. A tape cartridge loader as in claim 1, wherein the means for automatically moving the shuttle comprises:
   a conveyor automatically actuated for linear motion;
   at least one cam profile on the conveyor; and
   at least one cam follower bearing attached to the shuttle engaging and following the at least one cam profile to automatically move the shuttle to said position within the loader in response to linear motion of the conveyor.

3. A tape cartridge loader as in claim 2, wherein the cam profile comprises a region having a low pressure angle for applying force to the cam follower bearing to overcome the force of the springs opposing the movement of the shuttle to said position.

4. A tape cartridge loader as in claim 2, wherein:
   the conveyor comprises a first sidewall and a second sidewall opposite the first sidewall;
   the at least one cam profile comprises a first cam profile formed in the first sidewall and a second cam profile formed in the second sidewall; and
   the at least one cam follower bearing comprises a first bearing attached to one side of the shuttle and a second bearing attached to an opposing side of the shuttle, the first bearing engaging the first cam profile and the second bearing engaging the second cam profile.

5. A tape cartridge loader as in claim 4, wherein each of the first and second cam profiles comprises a region having a low pressure angle for applying force to overcome the force of the springs opposing the movement of the shuttle to said position.

6. A tape cartridge loader as in claim 2, further comprising automatic actuator means, coupled to the conveyor, for automatically inducing back and forth linear motion of the conveyor.

7. A tape cartridge loader, for automatically loading a tape cartridge into a tape drive for reading and writing data on a tape within the cartridge, the loader comprising:
   a base;
   a frame housing secured to the base;
   a conveyor mounted for linear motion in a first direction within the frame housing during loading of the tape cartridge and for linear motion in a second direction within the frame housing during unloading of the tape cartridge,
   an actuator system coupled to the conveyor, automatically driven for inducing linear motion of the conveyor in the first and second directions;
   a shuttle for receiving the tape cartridge;
   at least one cam profile and at least one cam follower bearing, coupling the shuttle to the conveyor, for moving the shuttle to and from a position within the loader in which a gear within the tape cartridge engages a gear coupled to a drive motor of the tape drive in response to the linear motions of the conveyor during loading and unloading of the tape cartridge, respectively; and
   at least one spring for producing a force opposing movement of the shuttle to said position and assisting movement of the shuttle from said position in such manner as to assist in separating the gear within the tape cartridge from the gear coupled to the drive motor,
   wherein the at least one cam profile comprises:
      a first inclined section having a high pressure angle for inducing a substantial portion of the motion of the at least one cam follower bearing and the shuttle toward said position; and
      a second section having a low pressure angle for inducing additional motion of the at least one cam follower bearing and the shuttle to reach said position and overcome the opposing force produced by the at least one spring.

8. A tape cartridge loader as in claim 7, wherein the second section induces motion of the shuttle past said position, to produce a gap between a surface of the cartridge and an adjacent surface of the shuttle.

9. A tape cartridge loader as in claim 8, wherein the shuttle comprises a plurality of cantilevered springs for applying spring force toward the tape drive motor to the cartridge within the shuttle and for buffering the cartridge within the shuttle when the shuttle moves past said position.

10. A tape cartridge loader, for automatically loading a tape cartridge into a tape drive for reading and writing data on a tape within the cartridge, the loader comprising:
   a base;
   a frame housing secured to the base;
   a conveyor mounted for linear motion in a first direction within the frame housing during loading of the tape cartridge and for linear motion in a second direction within the frame housing during unloading of the tape cartridge,
   an actuator system coupled to the conveyor, automatically driven for inducing linear motion of the conveyor in the first and second directions;
   a shuttle for receiving the tape cartridge;
   at least one cam profile and at least one cam follower bearing, coupling the shuttle to the conveyor, for moving the shuttle to and from a position within the loader in which a gear within the tape cartridge engages a gear coupled to a drive motor of the tape drive in response to the linear motions of the conveyor during loading and unloading of the tape cartridge, respectively; and
   at least one spring for producing a force opposing movement of the shuttle to said position and assisting movement of the shuttle from said position in such manner as to assist in separating the gear within the tape cartridge from the gear coupled to the drive motor, wherein the at least one spring comprises a compression spring attached to the base for compression by the shuttle as it moves to said position.

11. A tape cartridge loader, for automatically loading a tape cartridge into a tape drive for reading and writing data on a tape within the cartridge, the loader comprising:

a base;

a frame housing secured to the base;

a conveyor mounted for linear motion in a first direction within the frame housing during loading of the tape cartridge and for linear motion in a second direction within the frame housing during unloading of the tape cartridge, an actuator system coupled to the conveyor, automatically driven for inducing linear motion of the conveyor in the first and second directions;

a shuttle for receiving the tape cartridge;

at least one cam profile and at least one cam follower bearing, coupling the shuttle to the conveyor, for moving the shuttle to and from a position within the loader in which a gear within the tape cartridge engages a gear coupled to a drive motor of the tape drive in response to the linear motions of the conveyor during loading and unloading of the tape cartridge, respectively; and a pair of springs attached to the base for producing a force opposing movement of the shuttle to said position and assisting movement of the shuttle from said position in such manner as to assist in separating the gear within the tape cartridge from the gear coupled to the drive motor.

12. A tape cartridge loader, for loading a tape cartridge into a tape drive for reading and writing data on a tape within the cartridge, the tape loader comprising:

a conveyor mounted for linear motion, the conveyor having opposing first and second sidewalls, a first cam profile in the first sidewall, and a second cam profile in the second sidewall;

a shuttle for receiving the tape cartridge;

a first cam follower bearing attached to a first side of the shuttle in cam engagement with the first cam profile;

a second cam follower bearing attached to a second side of the shuttle opposite to the first side of the shuttle, the second cam follower bearing being in engagement with the second cam profile, wherein:

the second cam follower bearing is larger than the first cam follower bearing, and the first and second cam profiles are contoured so that interaction of the first and second cam follower bearings respectively with the first and second cam profiles during unloading of the tape cartridge from the loader provides a difference between forces on opposing sides of the tape cartridge.

13. A tape cartridge loader as in claim 12, in combination with:

a tape drive motor;

a tape drive gear coupled for rotation by the tape drive motor; and a magnet secured to the tape drive gear for magnetically attracting a gear within the tape cartridge, wherein the different forces on opposing sides of the tape cartridge help to separate the gear within the tape cartridge from the tape drive gear during unloading of the tape cartridge.

14. A tape cartridge loader as in claim 12, further comprising at least one spring positioned to apply a load balancing force to assist in initial movement of the shuttle during the unloading of the tape cartridge.

15. A tape cartridge loader, for loading a tape cartridge into a tape drive for reading and writing data on a tape within the cartridge, the tape loader comprising:

a conveyor mounted for linear motion, the conveyor having opposing first and second sidewalls, a first cam profile in the first sidewall, and a second cam profile in the second sidewall;

a shuttle for receiving the tape cartridge;

a first cam follower bearing attached to a first side of the shuttle in cam engagement with the first cam profile;

a second cam follower bearing attached to a second side of the shuttle opposite to the first side of the shuttle, the second cam follower bearing being in engagement with the second cam profile, wherein:

the second cam follower bearing is larger than the first cam follower bearing, the first and second cam profiles are contoured so that interaction of the first and second cam follower bearings respectively with the first and second cam profiles during unloading of the tape cartridge from the loader provides different forces on opposing sides of the tape cartridge, and the first and second cam profiles are contoured such that motion of the conveyor during unloading causes the first cam profile to apply force through the first cam follower bearing to the shuttle prior to the second cam profile applying force through the second cam follower bearing to the shuttle.

16. A tape cartridge loader as in claim 15, wherein the cam profiles are inclined relative to the linear motion of the conveyor.

17. A tape cartridge loader as in claim 15, further comprising:

a third cam profile formed in the first sidewall of the conveyor; and a third cam follower bearing attached to the first side of the shuttle for interaction with the third cam profile.

18. A tape cartridge loader as in claim 17, wherein the third cam follower bearing is substantially similar in size to the first cam follower bearing, and the third cam profile is similar in contour to the first cam profile.

19. A tape cartridge loader as in claim 15, further comprising a frame housing, wherein the conveyor is mounted for linear motion within the frame housing.

20. A tape cartridge loader as in claim 19, further comprising:

an actuator coupled to the frame housing for inducing the linear motion of the conveyor; and a motor coupled to the actuator for driving the actuator in response to a drive signal.

21. A tape cartridge loader, for loading a tape cartridge into a tape drive for reading and writing data on a tape within the cartridge, the tape loader comprising:

a frame housing;

a conveyor mounted for linear motion within the frame housing, the conveyor having opposing first and second sidewalls, a first cam profile in the first sidewall, and a second cam profile in the second sidewall;

a shuttle for receiving the tape cartridge;

a first cam follower bearing attached to a first side of the shuttle in cam engagement with the first cam profile;

a second cam follower bearing attached to a second side of the shuttle opposite to the first side of the shuttle, the second cam follower bearing being in engagement with the second cam profile, wherein:

the second cam follower bearing is larger than the first cam follower bearing, the first and second cam profiles are contoured so that interaction of the first and second cam follower bearings respectively with the first and second cam profiles during unloading of the tape cartridge from the loader provides different forces on opposing sides of the tape cartridge, the frame housing comprises a path constraint groove comprising a first section parallel to the linear motion of the conveyor and a second section perpendicular to the first section; and one of the cam follower bearings also interacts with the path constraint groove to limit motion of the shuttle to a path defined by the path constraint groove.

22. A tape cartridge loader as in claim 21, wherein the one cam follower bearing comprises the second cam follower bearing.

23. A tape drive for a data tape cartridge comprising:

a tape drive motor;

a tape drive gear coupled for rotation by the tape drive motor;

a magnet secured to the tape drive gear for magnetically attracting a gear within the tape cartridge; and an automatic loader for loading the tape cartridge such that the tape drive gear engages the gear within the tape cartridge and for unloading the tape cartridge from engagement and from the tape drive, the automatic loader comprising:

(a) a frame housing;

(b) a conveyor mounted for linear motion in a first direction within the frame housing during loading of the tape cartridge and for linear motion in a second direction within the frame housing during unloading of the tape cartridge, the conveyor having first and second sidewalls, a first groove formed in the first sidewall, and a second groove formed in the second sidewall, each of the first and second grooves having a cam profile for loading and a cam profile for unloading;

(c) an actuator coupled to the conveyor, automatically driven for inducing linear motion of the conveyor in the first and second directions;

(d) a shuttle for receiving the tape cartridge;

(e) a first cam follower bearing, attached to a first side of the shuttle, for cam engagement with the cam profiles of the first groove; and (f) a second cam follower bearing, attached to a second side of the shuttle opposite to the first side of the shuttle, for engagement with the cam profiles of the second groove, the second cam follower bearing being larger than the first cam follower bearing, wherein:

the loading cam profiles of the first and second grooves are contoured so that interaction with the first and second cam follower bearings respectively during tape cartridge loading induces a motion of the shuttle for retracting the tape cartridge into the frame housing and into engagement of the gear within the tape cartridge with the tape drive gear, and the unloading cam profiles of the first and second grooves are contoured so that interaction with the first and second cam follower bearings respectively during unloading of the tape cartridge from the loader provides different forces on opposing sides of the tape cartridge, to assist in overcoming attraction and engagement by the magnet and in separation of the gear within the tape cartridge from engagement with the tape drive gear.

24. A tape drive as in claim 23, wherein:

the frame housing comprises a path constraint groove comprising a first section parallel to the linear motion of the conveyor and a second section perpendicular to the first section; and one of the cam follower bearings also interacts with the path constraint groove to limit motion of the shuttle to a path defined by the path constraint groove.

25. A tape drive as in claim 24, wherein the one cam follower bearing is the second cam follower bearing.

26. A tape drive as in claim 23, wherein the actuator comprises:

an arm rotatably coupled to the frame housing and coupled to the conveyor; and a motor for selectively rotating the arm in opposite directions during loading and unloading operations.

27. A tape drive as in claim 23, wherein:

the first sidewall has a third groove, edges of which provide a cam profile for loading and a cam profile for unloading; and the loader further comprises a third cam follower bearing attached to the first side of the shuttle for interaction with the cam profiles of the third groove.

28. A tape drive as in claim 27, wherein the third cam follower bearing is substantially similar in size to the first cam follower bearing, and contours of the cam profiles of the third groove are substantially similar to contours of the cam profiles of the first groove.

29. A tape drive as in claim 23, wherein the shuttle comprises a plurality of cantilevered springs for applying spring force toward the tape drive motor to a cartridge within the shuttle.

30. A tape drive as in claim 29, wherein the shuttle further comprises at least one spring for engaging a registration notch in the tape cartridge when the tape cartridge is fully inserted into the shuttle.

31. A tape drive as in claim 29, wherein the shuttle further comprises at least one extruded feature for justifying the tape cartridge toward one side of the shuttle when the tape cartridge is inserted into the shuttle.

32. A loader, for automatically loading a tape cartridge into a tape drive for reading and writing data on a tape within the cartridge, the loader comprising:

a cartridge shuttle for receiving the tape cartridge and moving to and from a position in which the tape cartridge is loaded within the tape drive; and means for producing a force to assist in separating the gear within the tape cartridge from the gear coupled to the drive motor.

* * * * *